(12) United States Patent
Oravecz

(10) Patent No.: US 9,272,748 B1
(45) Date of Patent: Mar. 1, 2016

(54) MECHANISM FOR EFFECTING TRANSLATIONAL AND ROTATIONAL MOTION

(71) Applicant: Paul Oravecz, Los Angeles, CA (US)

(72) Inventor: Paul Oravecz, Los Angeles, CA (US)

( * ) Notice: Subject to any disclaimer, the term of this patent is extended or adjusted under 35 U.S.C. 154(b) by 0 days.

(21) Appl. No.: 14/629,944

(22) Filed: Feb. 24, 2015

(51) Int. Cl.
*B62K 21/16* (2006.01)
*B62K 11/14* (2006.01)

(52) U.S. Cl.
CPC .............. *B62K 21/16* (2013.01); *B62K 11/14* (2013.01); *Y10T 74/20792* (2015.01)

(58) Field of Classification Search
CPC .... Y10T 74/2078; Y10T 74/20792–74/20822; Y10T 74/18696; Y10T 74/18616; B62K 21/16; B62K 21/12; B62K 21/22; B62K 11/14; B62K 19/32; B62B 1/22; F16H 2025/2071; F16H 2025/2053
See application file for complete search history.

(56) References Cited

U.S. PATENT DOCUMENTS

| | | | | |
|---|---|---|---|---|
| 1,958,424 A * | 5/1934 | Gebhard | ...................... | 361/296 |
| 2,933,939 A * | 4/1960 | Brandt | ......................... | 74/89.38 |
| 3,874,700 A * | 4/1975 | Lohr et al. | ..................... | 280/240 |
| 4,023,436 A * | 5/1977 | Dodge | ......................... | 74/551.3 |
| 4,131,776 A * | 12/1978 | Ehrenberger | ................. | 200/500 |
| 4,440,050 A * | 4/1984 | Kagerer | ........................... | 82/134 |
| 4,896,559 A * | 1/1990 | Marier et al. | ................ | 74/551.4 |
| 5,197,349 A * | 3/1993 | Herman | ....................... | 74/551.1 |
| 5,373,752 A * | 12/1994 | Schlagwein | ................. | 74/89.38 |
| 6,176,503 B1 * | 1/2001 | George | ......................... | 280/274 |
| 2006/0032688 A1 * | 2/2006 | Sanchez et al. | .............. | 180/219 |
| 2009/0288511 A1 * | 11/2009 | Kuribayashi et al. | ........ | 74/89.38 |
| 2010/0236343 A1 * | 9/2010 | Chiang et al. | ................ | 74/89.34 |

FOREIGN PATENT DOCUMENTS

| | | | |
|---|---|---|---|
| DE | 1918170 A1 | * | 10/1969 |
| DE | 4136296 A1 | * | 5/1993 |
| DE | 19946100 A1 | * | 4/2001 |
| WO | WO 0224519 A1 | * | 3/2002 |

* cited by examiner

*Primary Examiner* — Daniel Yabut
(74) *Attorney, Agent, or Firm* — William J. Benman; Benman, Brown & Williams

(57) ABSTRACT

A single motor system for automatically changing the height and tilt angle of handlebars on a vehicle. The inventive system includes a first shaft; a solenoid for translating the first shaft along a first axis from a first position to a second position; a first motor for rotating the shaft about the axis in the first and the second positions; an arrangement for rotating the payload about a second axis, in response of the rotational motion of the shaft, when the shaft is in the first position; and a gear set for converting the rotational motion of the shaft in the second position to translational motion of a payload coupled thereto along a third axis.

11 Claims, 8 Drawing Sheets

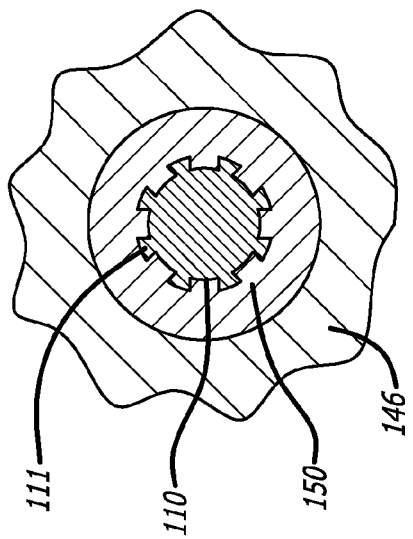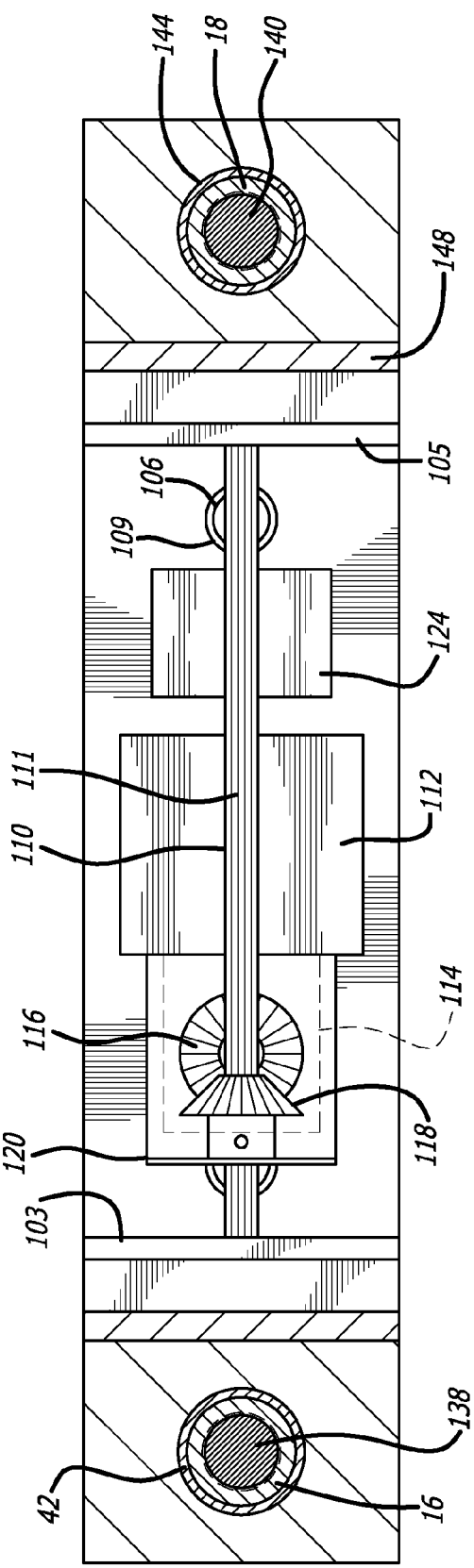

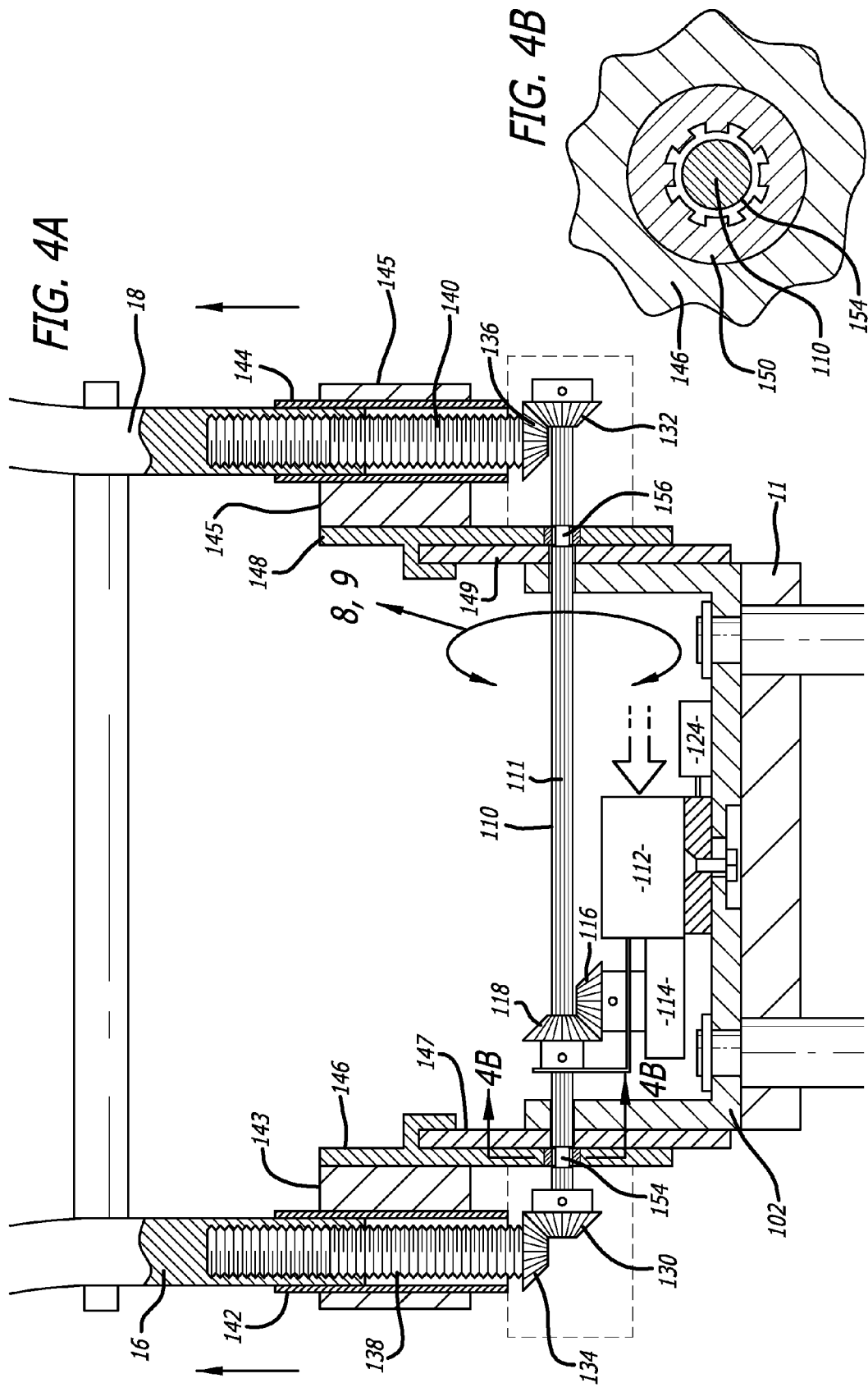

US 9,272,748 B1

MECHANISM FOR EFFECTING TRANSLATIONAL AND ROTATIONAL MOTION

BACKGROUND OF THE INVENTION

1. Field of the Invention

The present invention relates to mechanical systems. More specifically, the present invention relates to systems and for inducing translational and rotational movement.

2. Description of the Related Art

For a variety of applications, there is a need for a mechanism for inducing rotational as well as translational motion. For example, it is well-known in the motorcycle community that the typically fixed position of the handlebars has numerous limitations including: 1) a suboptimal positioning of the handlebars for a rider; 2) even if optimal at one time, the fixed handlebar position can be uncomfortable for a rider on another occasion due to injury, illness, weight gain or a variety of other changes in the riders condition or mood; and/or 3) the position of the handlebars, even if comfortable at the start of a ride, can become uncomfortable over time after long hours on the road.

Accordingly, a need existed in the art for an apparatus and method for adjusting the position of handlebars for motorcycles and other similar vehicles. While adjustable handlebars were known in the art, these systems typically required the user to adjust the handlebar positions mechanically and by hand. This was slow, cumbersome and typically provided a discrete set of position options as opposed to a continuous set of position options. Hence, a need remained in the art for an easy to use motorized system and method for adjusting motorcycle handle bars over a continuous range of motion.

The need was addressed by an invention disclosed by P. Oravecz in U.S. Pat. No. 9,038,500 B1 entitled SYSTEM AND METHOD FOR CONTINUOUSLY VARIABLE MOTORIZED ADJUSTMENT OF MOTORCYCLE HANDLEBARS, issued May 26, 2015, the teachings of which are incorporated herein by reference. This application discloses and claims a motorized system for adjusting the tilt angle and telescopic position of handlebars mounted on a motorcycle, bicycle or other vehicle.

While this invention substantially addresses the need in the art, unfortunately, it requires two motors. This adds to the cost and weight of the arrangement.

Hence, a need remains for a system for a system for adjusting the rider's position while still controlling the motorcycle (i.e., throttle, brake, clutch, etc.) and allowing for use of the original handlebars with a single motor. More generally, a need remains in the art for a system and method for inducing rotational as well as translational motion of a mechanism with a single motor.

SUMMARY OF THE INVENTION

The need in the art is addressed by the single motor system for automatically changing the height and tilt angle of handlebars on a vehicle of the present invention. In the illustrative application, the inventive system includes a first shaft; a solenoid for translating the first shaft along a first axis from a first position to a second position; a first motor for rotating the shaft about the axis in the first and the second positions; an arrangement for rotating the payload about a second axis, in response of the rotational motion of the shaft, when the shaft is in the first position; and a gear set for converting the rotational motion of the shaft in the second position to translational motion of a payload coupled thereto along a third axis.

BRIEF DESCRIPTION OF THE DRAWINGS

FIG. 3B is a fragmentary end view of the shaft of the two phase clutchless transmission of FIG. 3A in the angular mode of operation.

FIG. 3C is a fragmentary top plan view of the two phase clutchless transmission of the motorcycle depicted in FIG. 2.

FIG. 4A is fragmentary front view of the two phase clutch-less transmission of the motorcycle depicted in FIG. 2 in a linear mode of operation.

FIG. 4B is a fragmentary end view of the shaft of the two phase clutchless transmission of FIG. 4A in the linear mode of operation.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
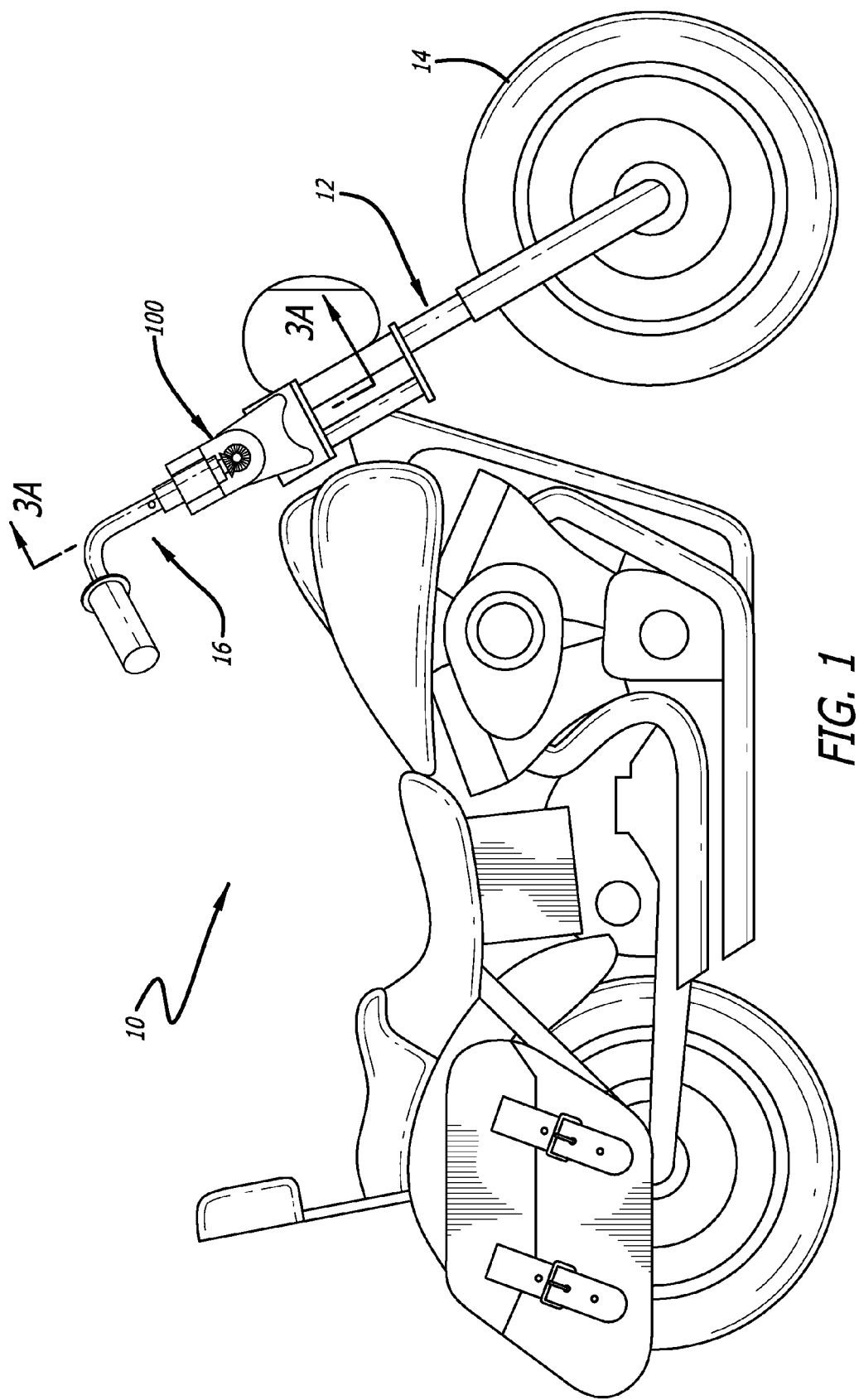
FIG. 1 is a side view of a motorcycle as an illustrative application of the two phase clutch-less transmission of the present invention.

FIG. 1 is a side view of a motorcycle 10 as an illustrative application of the two phase clutch-less transmission 100 of the present invention. Those of ordinary skill in the art will appreciate that the transmission 100 of the present invention may be used in a variety of other applications as well.

Figure 2:
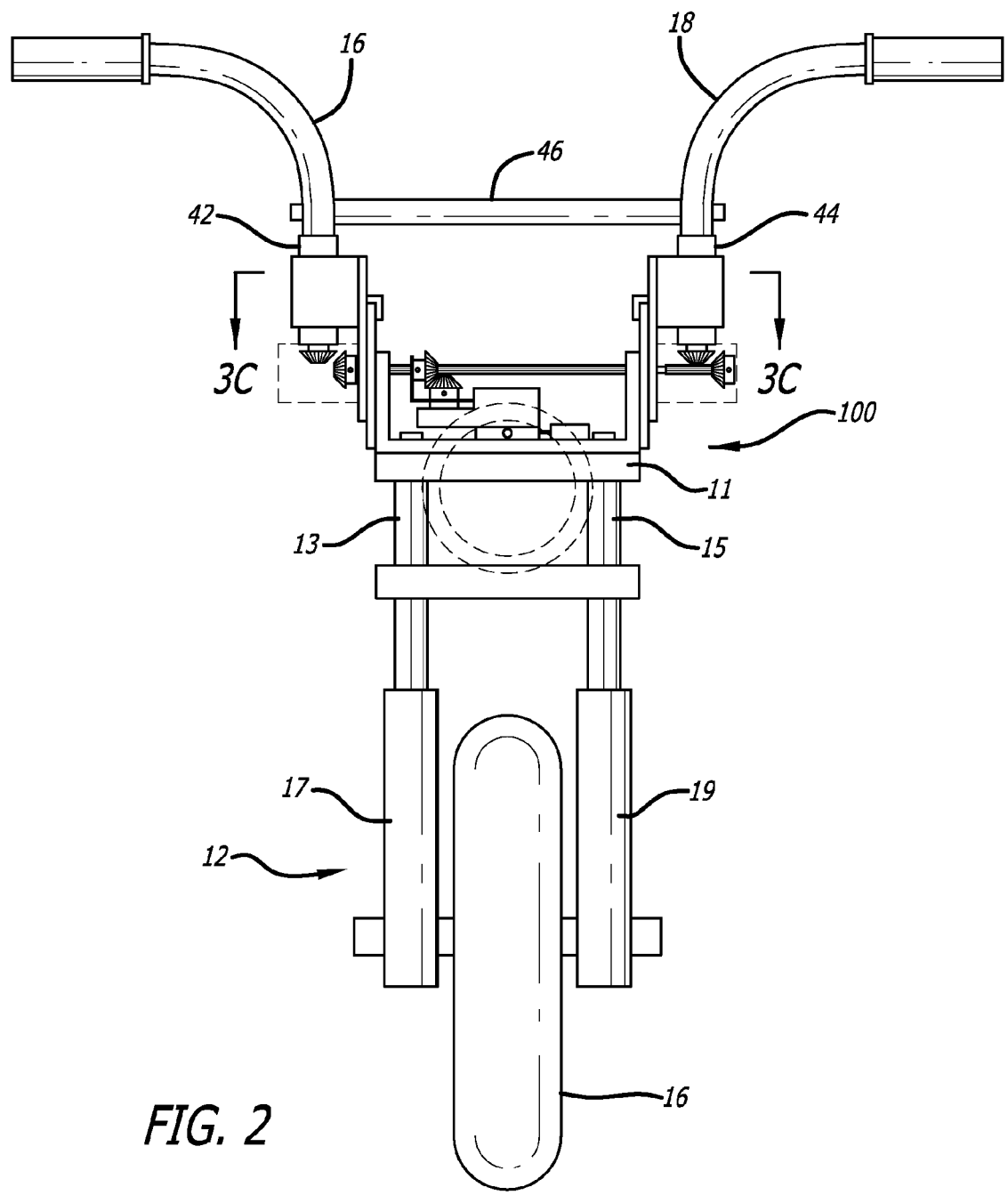
FIG. 2 is a front view of the motorcycle depicted in FIG. 1.

FIG. 2 is a front view of the motorcycle depicted in FIG. 1. As shown in the figures, the motorcycle 10 has a fork 12 at which a wheel 14 is mounted. Handlebars 16, 18 extend from the fork 12 through the two phase clutch-less transmission 100 of the present invention.

As shown in FIG. 2, first and second prongs 13 and 15 engage first and second shock absorbers 17 and 19. The two phase clutch-less transmission 100 of the present invention rests on headstock 11 secured to the fork 12 on the motorcycle headstock 11 between first and second prongs 13 and 15 thereof.

Figure 3A:
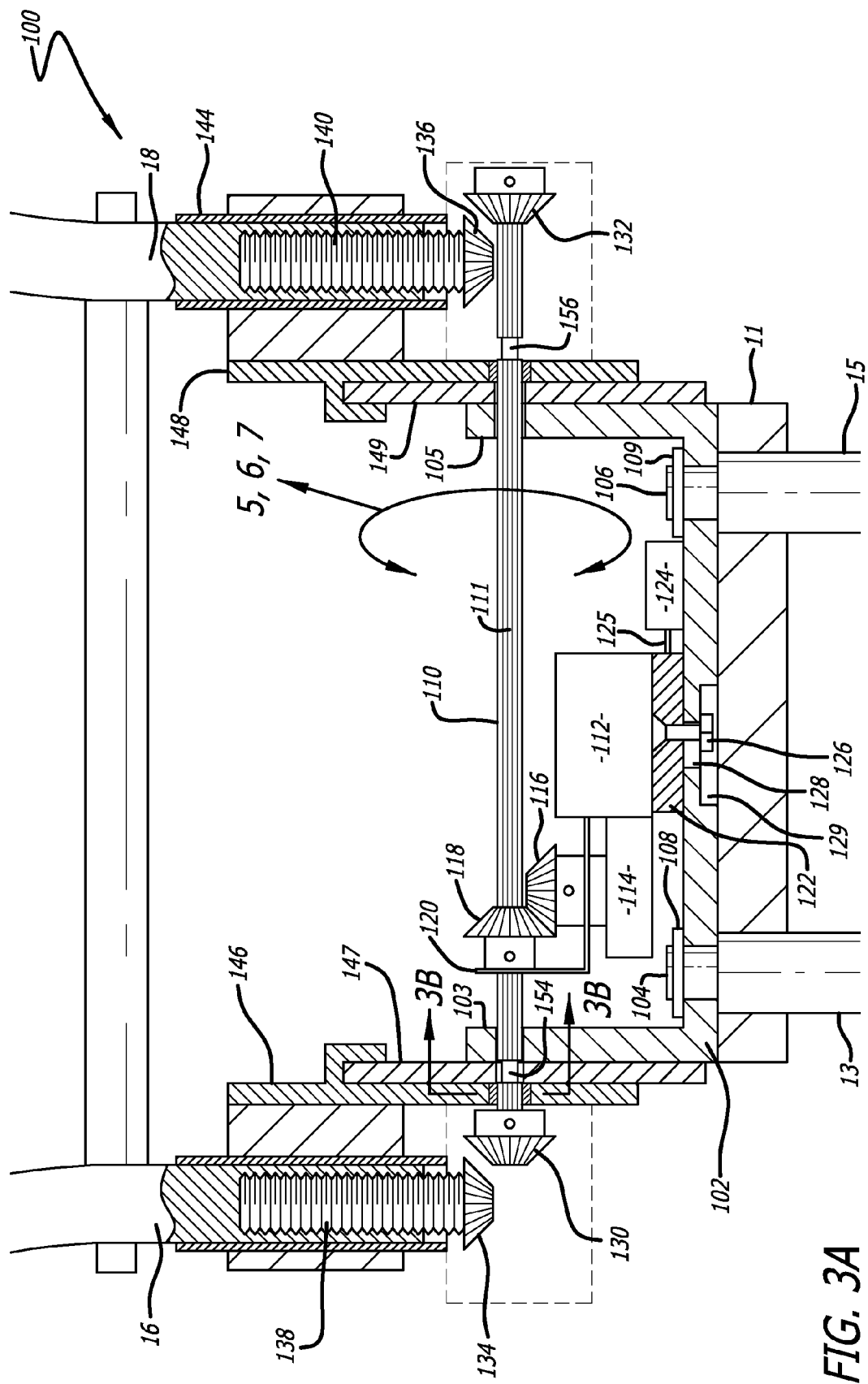
FIG. 3A is an exploded sectional fragmentary front view of the two phase clutchless transmission of the motorcycle depicted in FIG. 2 in an angular mode of operation.

FIG. 3A is an exploded sectional fragmentary front view of the two phase clutchless transmission 100 of the motorcycle 10 depicted in FIG. 2 in a first (angular) mode of operation by which the tilt angle of the handlebars 16 and 18 are adjusted as discussed more fully below. (For clarity, some elements, e.g. 112, 114, are shown in elevation as opposed to cross-section. Also the bevel gears are not shown in cross-section.) As shown in FIG. 3A, the transmission 100 is mounted on a U-shaped frame 102 that is secured to a headstock 11 by first and second bolts 104 and 106. The first and second bolts 104 and 106 extend through first and second washers 108 and 109 respectively.

A shaft 110 is mounted with its longitudinal axis parallel with the longitudinal axis of the frame 102 and extends through the distal and proximal ends thereof, 103 and 105. The shaft 110 has a plurality of uniformly spaced ribs 111 extending along the length thereof that provide teeth, across the transverse axis thereof, adapted to engage gears in hinge gear assemblies 146 and 148 as shown in the sectional end view of FIG. 3B in the first (angular) mode of operation as discussed more fully below.

As shown in FIG. 3A, the shaft 110 is driven by a motor 112 through a power train consisting of a gear assembly 114, a first bevel gear 116 and second bevel gear 118. The second bevel gear 118 is mounted on the shaft 110 such that rotation of the first bevel gear 116 by the motor 112 through the transmission 114 about a rotational axis of the first bevel gear 116 causes a rotation of the second bevel gear 118 about the longitudinal axis of the shaft 110 due to the engagement of the second bevel gear 118. Those of ordinary skill in the art will recognize that the present invention is not limited to the gear arrangements shown herein. Other gear arrangements and power train designs may be utilized without departing from the scope of the present teachings.

The drive motor 112 is of conventional design. A suitable drive motor 112 may be purchased from Suzhou Chuangtou Machinery and Electrical Technology Co. Ltd. and other manufacturers.

An L-shaped bracket 120 secures the third bevel gear 118 and shaft 110 to the housing of the motor 112. The arrangement is illustrated from another perspective in FIG. 3C.

FIG. 3C is a fragmentary top plan view of the shaft 110, motor 112 and power train 114, 116 and 118 of the two phase clutchless transmission of the motorcycle depicted in FIG. 2.

Returning to FIG. 3A, the motor 112 and associated transmission assembly 114 are mounted on a sled 122 that is mounted for translation of the floor of the U-shaped frame 102 in response to a solenoid actuator 124 through a plunger 125 operationally coupled to the sled 122. The sled is secured to the frame 102 by a bolt 126. In response to the force applied by the solenoid plunger 125, the stem of the bolt 126 reciprocates in a channel 128 that defines the range of motion of the shaft 110 through sled 122, motor 112, and bracket 120. The nut of the bolt 126 moves without constraint in a larger channel 129 machined into the underside of the frame 102.

As shown in FIG. 3A, third and fourth bevel gears 130 and 132, respectively, are mounted on the proximal and distal ends of the shaft 110. Linear (left and right) translation of the shaft 110 causes the third and fourth bevel gears 132 to engage and disengage fifth and sixth bevel gears 134 and 136 respectively.

FIG. 3A shows a right most translation of the shaft 110 whereby the system 100 is in a first (angular) mode of operation).

FIG. 4A is fragmentary front view of the two phase clutchless transmission of the motorcycle depicted in FIG. 2 in a second (linear) mode of operation by which the height of the handlebars 16 and 18 are adjusted.

In the first (angular) mode shown in FIG. 3A, the rotation of the shaft 110 drives a gear 150 (FIG. 3B) in first and second gear assemblies 146 and 148 causing these assemblies to rotate about the rotation axes thereof. In the best mode, the rotation axes of these assemblies are coaxial with the longitudinal axis of the shaft 110. In the best mode, the first and second gear assemblies are implemented with recliner assemblies as disclosed in the copending patent application of P. Oravecz, the teachings of which have been incorporated herein by reference. These assemblies may be purchased from a number of manufacturers including Suzhou Chuangtou Machinery and Electrical Technology Co. Ltd. (Model: TJX-K5 Recliner, Power slider, Calf Support) by way of example. Inasmuch as such off-the-shelf mechanisms are optimized for automobile seats, some custom modifications may be required to remove superfluous and unnecessary components for a given application as will be appreciated by one of ordinary skill in the art.

The first and second gear assemblies 146 and 148 are secured to the frame 102 by first and second flanges 147 and 149.

Figure 5:
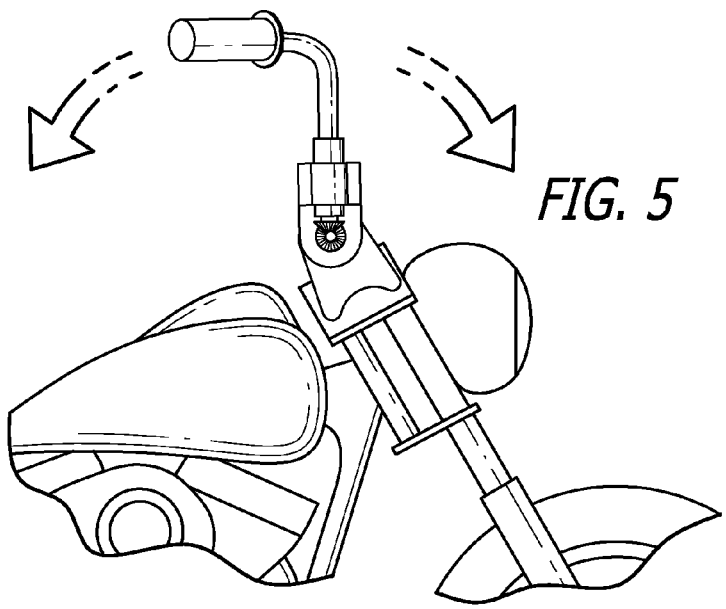
FIGS. 5-7 are fragmentary side views of the motorcycle of FIG. 1 with the handlebars shown in upright, full rearward and full forward angular positions respectively.
Figure 6:
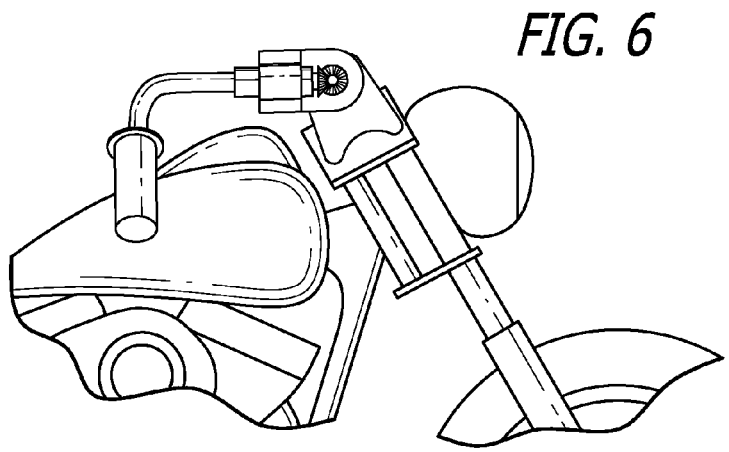
Figure 7:
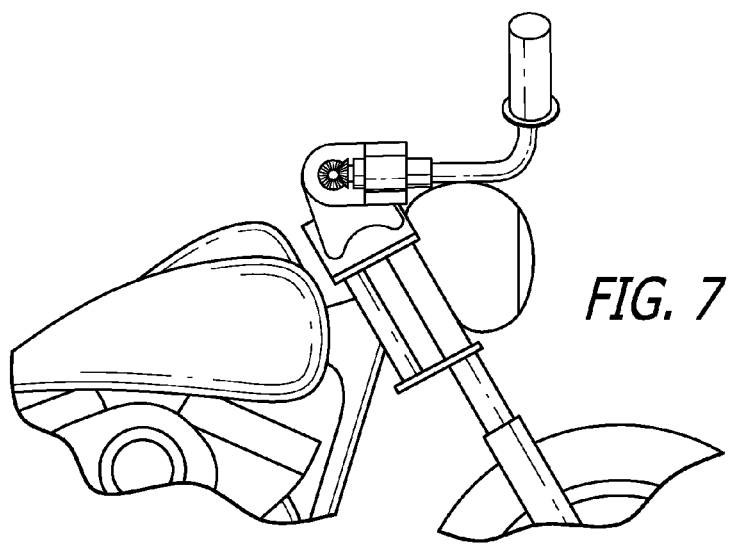

In the first angular mode of operation, rotation of the shaft 110 is effective to adjust the tilt angle of the handlebars 16 and 18 as depicted in FIGS. 5, 6 and 7.

FIGS. 5-7 are fragmentary side views of the motorcycle of FIG. 1 with the handlebars shown in upright, full rearward and full forward angular positions respectively. The present invention allows the tilt angle of the handlebars to be set at any angle subject to the range of motion, if any, of the gear assemblies 146 and 148. In the best mode, the range of motion is chosen to allow the rider to maintain a safe operation of the vehicle in a motorcycle application of the present teachings. However, for other applications, an unlimited range of motion might be preferred.

Returning to FIG. 3A, a left most translation of the shaft 110 results in a linear mode of operation depicted in FIG. 4A. In this mode, the shaft is moved to the left in FIG. 3A and the third and fourth bevel gears 130 and 132, thereof, engage the fifth and sixth bevel gears 134 and 136 respectively. This allows the rotation of the shaft to effect rotation of the worm drives 138 and 140, via the fifth and sixth bevel gears 134 and 136 respectively. The first and second threaded worm drives 138 and 140 are mounted in first and second shafts 142 and 144, respectively. In turn, first and second shafts 142 and 144 are mounted to the first and second gear assemblies 46 and 148 through brackets 143 and 145 respectively.

As shown in FIG. 4A, in accordance with the illustrative motorcycle application of the present teachings, the lower ends of the handlebars 16 and 18 have an internal female recess that is threaded to engage the threaded bolts of the worm drives 138 and 140 respectively. Hence, rotation of the drives 138 and 140 causes the handlebars 16 and 18, respectively, to raise and lower in response thereto. This is depicted in FIGS. 8 and 9.

Figure 8:
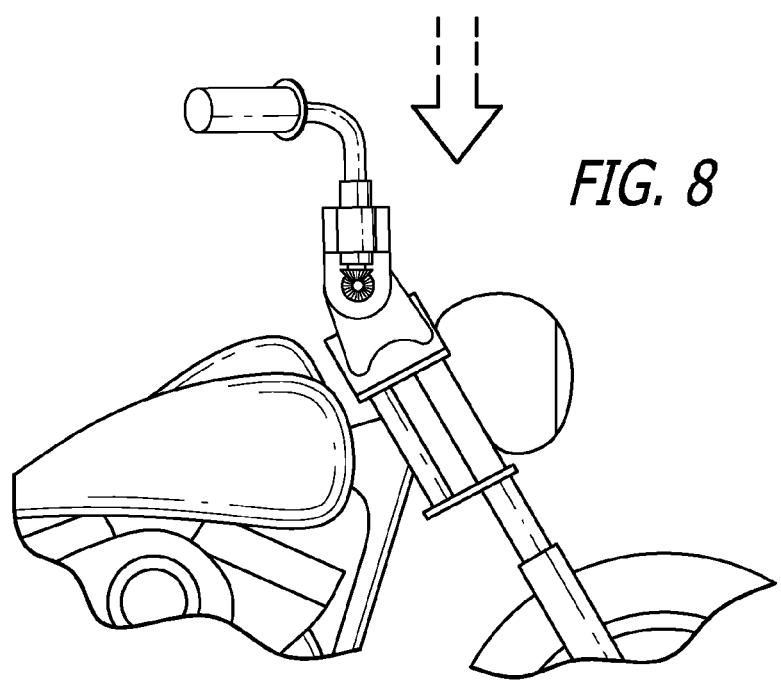
FIGS. 8 and 9 are fragmentary side views of the motorcycle of FIG. 1 with the handlebars shown in fully retracted and fully elevated linear positions respectively.
Figure 9:
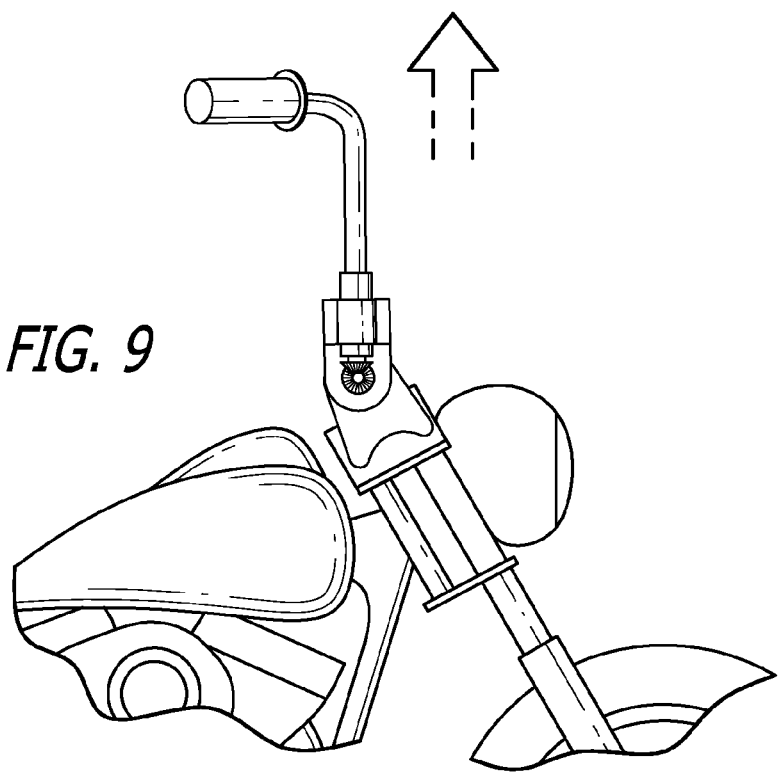

FIGS. 8 and 9 are fragmentary side views of the motorcycle of FIG. 1 with the handlebars shown in fully retracted and fully elevated linear positions respectively.

In this second (linear) mode of operation, it is preferred (but not required) that the linear motion of the handlebars be separated from the angular motion thereof. This is effected by disengaging the shaft 110 from the gear assemblies 146 and 148. This is achieved by providing a segment on the shaft 110 that is not ribbed so that when the shaft is in the second (linear) mode position depicted in FIG. 4A, the teeth 111 thereof (shown in FIG. 3B) are do not engage the gear 150 of either gear assembly. This is depicted by smooth rib free gaps 154 and 156 in FIGS. 4A and 4B.

FIG. 4B is a fragmentary end view of the shaft of the two phase clutchless transmission of FIG. 4A in the linear mode of operation.

Those of ordinary skill in the art will appreciate that the gaps 154 and 156 can be eliminated whereby the height and tilt angle of the payload, in this case handlebars, are varied in unison. This may be an important feature in those situations where it is desired to maintain the controls within the reach of the user and/or to increase the speed of adjustment from one position to the other.

In any case, it can be seen that the present invention allows for handlebar height and tilt angle to be adjusted with a single motor. It should also be appreciated that the solenoid mode switching actuator is optional inasmuch as the mode of operation could be changed by manually moving the shaft from one position to another. In this case, a spring and latch arrangement (not shown) would be used to bias the shaft in a default mode, if desired, and to maintain the shaft and therefore the entire mechanism in a selected mode of operation.

Figure 10:
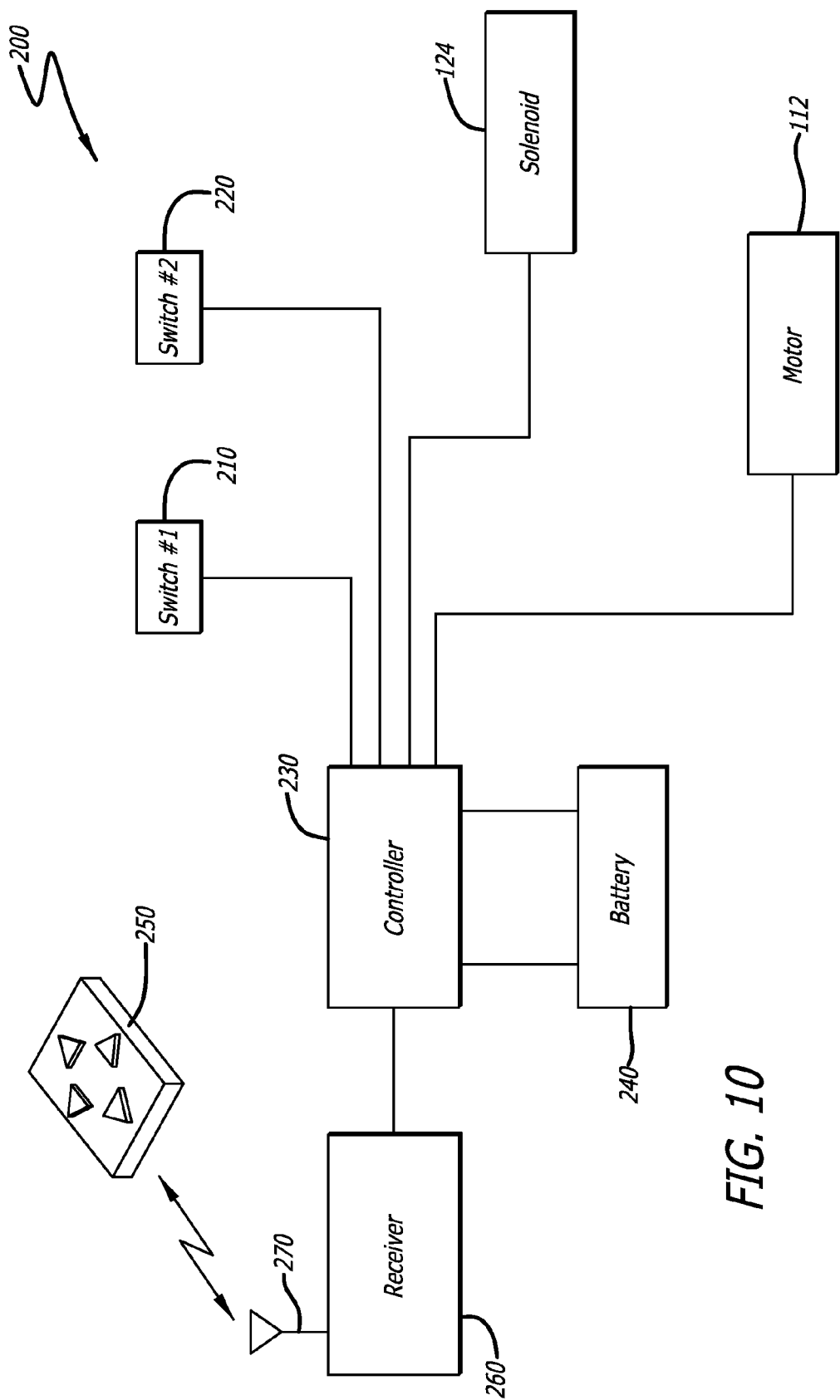
FIG. 10 is a block diagram of an illustrative embodiment of a control system of the two phase clutch-less transmission of the present invention.

FIG. 10 is a block diagram of an illustrative embodiment of a control system 200 of the two phase clutch-less transmission 100 of the present invention. The control system 200 includes a first switch 210 that provides forward and back or up and down actuation controls for the motor 112 via a controller 230. A second switch 220 provides linear/actuator mode control for the solenoid 124 via the controller 230. Power is supplied by the onboard battery 240, a standalone battery, or the power generator of the motorcycle. The controller 230 may be implemented digitally or with analog circuitry. As an alternative embodiment, the controller 230 may be implemented with a remote control 250 through a receiver 260 coupled thereto. The remote control could be voice activated and helmet mounted.

Thus, the present invention has been described herein with reference to a particular embodiment for a particular application. Those having ordinary skill in the art and access to the present teachings will recognize additional modifications, applications and embodiments within the scope thereof. For example, the present invention is not limited to use on motorcycles. Those of ordinary skill in the art will appreciate that the present invention can be used in any application for which angular and linear motion are required or desired with a single driver. Those of ordinary skill in the art will also appreciate that the invention is not limited to the use of electric motors. Hydraulic, pneumatic and/or other actuators may be used without departing from the scope of the present teachings. The shaft could be mounted to extend through the rotor of the motor so that is driven by the motor directly. In this case, the motor rotor is coaxial with the shaft.

It is therefore intended by the appended claims to cover any and all such applications, modifications and embodiments within the scope of the present invention.

Accordingly,

What is claimed is:

1. A mechanism for effecting translational and rotational motion of handlebars comprising:
   a solenoid for translating a first shaft along a first axis from a first position to a second position;
   a motor for rotating said shaft about said first axis in said first and said second positions;
   gears rotating handlebars about a second axis, in response to said rotational motion of said shaft, when said shaft is in said first position; and
   an arrangement for converting said rotational motion of said shaft in said second position to translational motion of said handlebars coupled thereto along a third axis, said arrangement including:
   a second shaft mounted on said handlebars and adapted to rotate in response to rotation of said first shaft in said second position,
   a third shaft mounted on said handlebars and adapted to rotate in response to rotation of said first shaft in said second position, wherein said second and third shafts are at least partially threaded and
   first and second threaded elements mounted on said shafts and coupled to said handlebars, whereby rotational motion of said shafts induces translational motion of said elements and said handlebars.

2. The invention of claim 1 wherein said first and second axes are coaxial.

3. The invention of claim 1 wherein said first shaft includes first and second beveled gears mounted at first and second distal ends thereof.

4. The invention of claim 3 wherein said second shaft includes a third beveled gear adapted for engagement with said first beveled gear when said first shaft is in said second position and said third shaft includes a fourth beveled gear adapted for engagement with said second beveled gear when said first shaft is in said second position.

5. The invention of claim 1 wherein said handlebars are motorcycle handlebars.

6. The invention of claim 1 wherein said first and second threaded elements are mounted for reciprocal motion within first and second cylindrical tubes respectively in said handlebar.

7. The invention of claim 6 wherein said first and second cylindrical tubes are coupled to first and second flanges respectively, said flanges being mounted on said handlebar.

8. The invention of claim 7 wherein said first shaft extends through said first and second flanges without engagement in said second position and in engagement in said first position thereof.

9. The invention of claim 8 wherein said first shaft includes teeth adapted to engage said first and second flanges in said first position thereof whereby rotation of said first shaft about said first axis induces rotation of said first and second flanges and said payload.

10. The invention of claim 9 wherein said first shaft includes first and second annular sections with a diameter substantially smaller than the outside diameter thereof, whereby said first shaft does not engage said first and second flanges in said second position thereof.

11. The invention of claim 1 further including a switch for activating said solenoid.

* * * * *